A. F. WAGNER.
GEARING FOR GENERATORS AND DISTRIBUTERS.
APPLICATION FILED DEC. 1, 1917.

1,327,504.

Patented Jan. 6, 1920.

WITNESSES
Frank L. Faggiani.
A. L. Kitchin.

INVENTOR
Albert F. Wagner
BY
ATTORNEYS

UNITED STATES PATENT OFFICE.

ALBERT F. WAGNER, OF NEW YORK, N. Y.

GEARING FOR GENERATORS AND DISTRIBUTERS.

1,327,504.  Specification of Letters Patent.  Patented Jan. 6, 1920.

Application filed December 1, 1917. Serial No. 204,828.

*To all whom it may concern:*

Be it known that I, ALBERT F. WAGNER, a citizen of the United States, and a resident of the city of New York, borough of Manhattan, in the county and State of New York, have invented a new and Improved Gearing for Generators and Distributers, of which the following is a full, clear, and exact description.

This invention relates to lighting and igniting devices for internal combustion engines and has for an object the provision of an improved construction which is especially adapted for automobile engines.

Another object in view is to provide a construction whereby a distributer and generator may be run at different speeds from the same shaft.

A further object of the invention is the provision of an improved construction which is arranged so as to be quickly applied and removed bodily and which utilizes a generator and distributer arranged in such a manner that the generator may be removed at any time without disturbing the distributer and its proper action in connection with the engine.

A still further object of the invention is to provide a construction formed with a mounting which is used for supporting a generator and distributer which may be removed and a magneto substituted without changing any parts of the automobile or other structure to which the device is connected.

Figure 1:
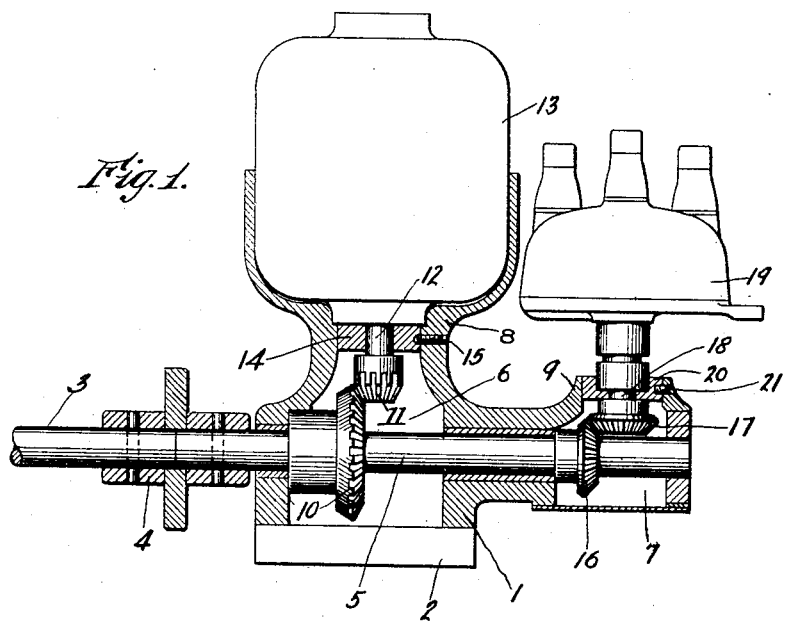
Figure 1 is a top plan view partially in section of an embodiment of the invention.

Referring to the accompanying drawing by numerals 1 indicates a casing or mounting which is provided with a base 2 adapted to be fitted into a suitable support on the automobile to which the device is applied. The same support to which the base 2 is adapted to be connected is formed to receive the base of a magneto whereby the mounting 1 may be bodily removed at any time and the magneto substituted and connected to the power shaft 3 by a coupling 4 without changing any of the parts of the automobile or magneto. The shaft 3 may be any desired driving shaft connected with the engine, as for instance the pump shaft, and may rotate at the same rate of speed as the engine, or at a different rate of speed. Coupler 4 is any suitable kind whereby shaft 5 is connected with the power shaft so as to rotate in the casing or mounting 1. In regard to the casing or mounting 1 it will be noted that same is formed with a chamber 6 and a chamber 7 for accommodating the various beveled gears hereinafter fully described, said chambers merging into openings provided by the neck sections 8 and 9 of the casing 1.

A beveled gear 10 is rigidly secured in any suitable manner to shaft 5, said beveled gear meshing with beveled pinion 11 secured to the shaft 12 of generator 13 whereby whenever the shaft 3 is rotated the generator will also be rotated. A bearing member 14 is provided on the shaft, said bearing member being secured by any suitable means, as for instance by set screws 15. In case it should be desirable to run the generator 13 faster or slower without changing the speed of the shaft 5, the generator together with the bearing member 14 and beveled pinion 11 is removed and a smaller or larger beveled pinion provided. If there is a considerable change in the size of the beveled pinion it will necessitate another gear 10. By thus changing the gears and pinions the speed of the generator 13 may be any desired number of revolutions per minute without varying the speed of the shaft 5.

Connected to the shaft 5 in the chamber 7 is a beveled gear 16 which meshes with beveled gear 17, said last mentioned gear being connected with shaft 18 which in turn operates the ignition distributer 19. A bearing member 20 surrounds the shaft 18 and properly supports the shaft and distributer. This bearing member may be held in place in any desired manner, as for instance by set screws 21, whereby the same may be readily removed and other gears substituted for gears 16 and 17. It will be noted that the ratio of gears is one one, but if desired the ratio could be changed by having either of the gears 16 or 17 larger or smaller. It will also be noted that either the distributer or the generator may be moved without molesting any other parts and new gears substituted for producing the desired number of revolutions per minute, or the desired ratio, without in any way changing the speed of shaft 3.

By the construction shown the distributer 19 may be used with the generator, or with batteries after the generator has been removed. In order that the entire construction may be removed and a magneto substituted the distance between the center of the shaft 5 and base 2 is the same and the sizes are the same as the usual standard magneto base. The generator by reason of its particular mounting so as to produce the desired speed may be of any desired make, so that the current therethrough may be used for ignition purposes and charging storage batteries, as well as for lighting.

In the drawing the distributer is shown at the right, for instance of a generator, and parallel therewith, but it is evident that the distributer could be arranged at right angles thereto around shaft 5, opposite thereto, or in any other desired relative position. It is also evident that the distributer could be arranged on the opposite side of the generator, that is between the generator and the coupler 4.

Figure 2:
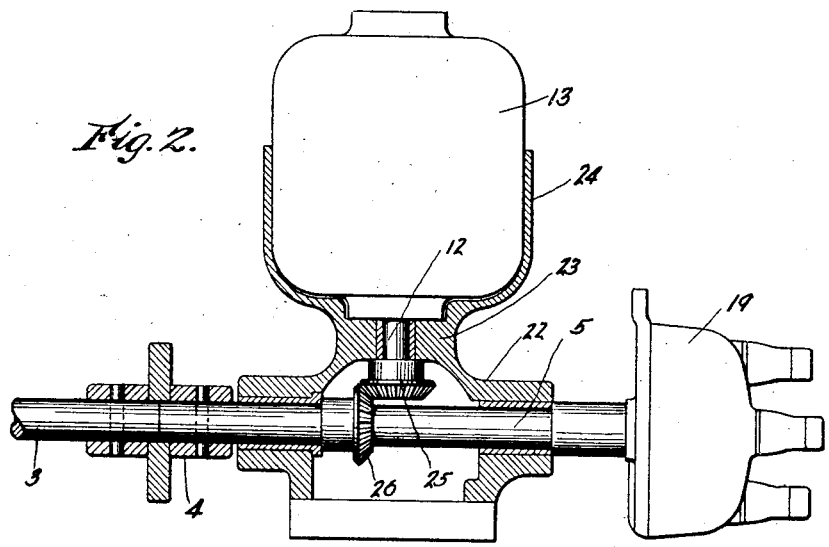
Fig. 2 is a horizontal sectional view through a slight modified form of the invention.

In Fig. 2 will be seen a slightly modified form of the invention in which the distributer 19 is arranged in a plane at right angles to the plane of the distributer in Fig. 1, said last mentioned distributer being connected directly with the shaft 5, while a casing 22 is provided for shaft 12, but the neck portion 23 is preferably integral with the casing 22 instead of a bearing member, similar to bearing member 14. Neck 23 merges into cup-shaped structure 24 which assists in holding the generator 13 in place. Shaft 12 is connected to the shaft 5 through beveled gears 25 and 26 which beveled gears may be of the same size or different sizes as desired.

What I claim is:

1. A device of the character described, comprising a support having alined shaft bearings and having a gear chamber therein between the bearings, a cup-shaped member on the support adapted to receive a generator therein, and said support having a bearing extending from the gear chamber into the cup-shaped member for the reception of the generator shaft.

2. A device of the character described, comprising a support having alined shaft bearings and having a gear chamber therein between the bearings, a cup-shaped member on the support adapted to receive a generator therein, said support having a bearing extending from the gear chamber into the cup-shaped member for the reception of the generator shaft, and said support having a second gear chamber therein and adapted to support a distributer adjacent said last-mentioned gear chamber.

3. In a device of the character described, the combination with a power shaft, generator and ignition distributer of a driving shaft connected with the power shaft, a casing for said driving shaft, said casing having a pair of chambers open on the same side, a pair of beveled gears for the generator for connecting the shaft thereof with said driving shaft, means for connecting the ignition distributer to said driving shaft, and means for supporting the generator in such a manner that the beveled gear connected therewith may be bodily removed through one of said openings in said casings.

4. In a device of the character described the combination with a generator and distributer of a driving shaft therefor, means connecting the distributer to the driving shaft, and a set of beveled gears for connecting the generator to the driving shaft, and a bracket formed with a cup-shaped member fitting over the exterior of the generator for part of its length supporting the same in a predetermined position in respect to the driving shaft.

5. In a device of the character described the combination with a generator and ignition distributer of a driving shaft, a bracket having a passageway for accommodating said driving shaft, said passageway merging into spaced chambers, a set of beveled gears arranged in each of said chambers, one of the gears in each chamber being connected with the driving shaft, means for connecting the other of said gears to the generator and ignition distributer respectively, a ring engaging said bracket adjacent each of said chambers for receiving the shafts of the generator and distributer respectively so as to hold the gear wheels connected therewith in proper position, and a locking means for locking said rings in place whereby the beveled gears may be bodily removed when the rings are removed.

ALBERT F. WAGNER.